United States Patent
Granqvist

[15] 3,677,646
[45] July 18, 1972

[54] INSTRUMENT FOR MEASURING DISTANCE

[72] Inventor: Carl Erik Granqvist, Lidingo, Sweden
[73] Assignee: Aga Aktiebolag, Lidingo, Sweden
[22] Filed: Sept. 8, 1969
[21] Appl. No.: 856,130

[30] Foreign Application Priority Data

Sept. 12, 1968 Sweden..............................12253/68

[52] U.S. Cl...........................................356/4, 356/5, 343/12
[51] Int. Cl...........................................G01c 3/08
[58] Field of Search..........................343/12, 10; 356/5, 4

[56] References Cited

UNITED STATES PATENTS

| | | |
|---|---|---|
| 3,565,528 | 2/1971 | White.....................................356/5 |
| 2,497,913 | 2/1950 | Rines......................................343/12 |
| 2,964,990 | 12/1960 | Pocher...................................356/5 |
| 3,256,766 | 6/1966 | Allesson.................................356/5 |

Primary Examiner—Benjamin A. Borchelt
Assistant Examiner—S. C. Buczinski
Attorney—Larson, Taylor and Hinds

[57] ABSTRACT

A distance measuring instrument of the type wherein a modulated beam of light is transmitted along a path to be measured, the light is reflected at the distance to be measured and received at the instrument, and a comparison is made between the modulation phase of the received signal and that of the transmitted signal to determine the distance in terms of the wavelength of the modulation signal, includes an arrangement for varying the wavelength in inverse proportion to the sine or cosine of the angle of elevation whereby the measurement obtained is related to the vertical or horizontal projection of the distance irrespective of the elevation of the instrument.

5 Claims, 3 Drawing Figures

INVENTOR
CARL-ERIK GRANQVIST

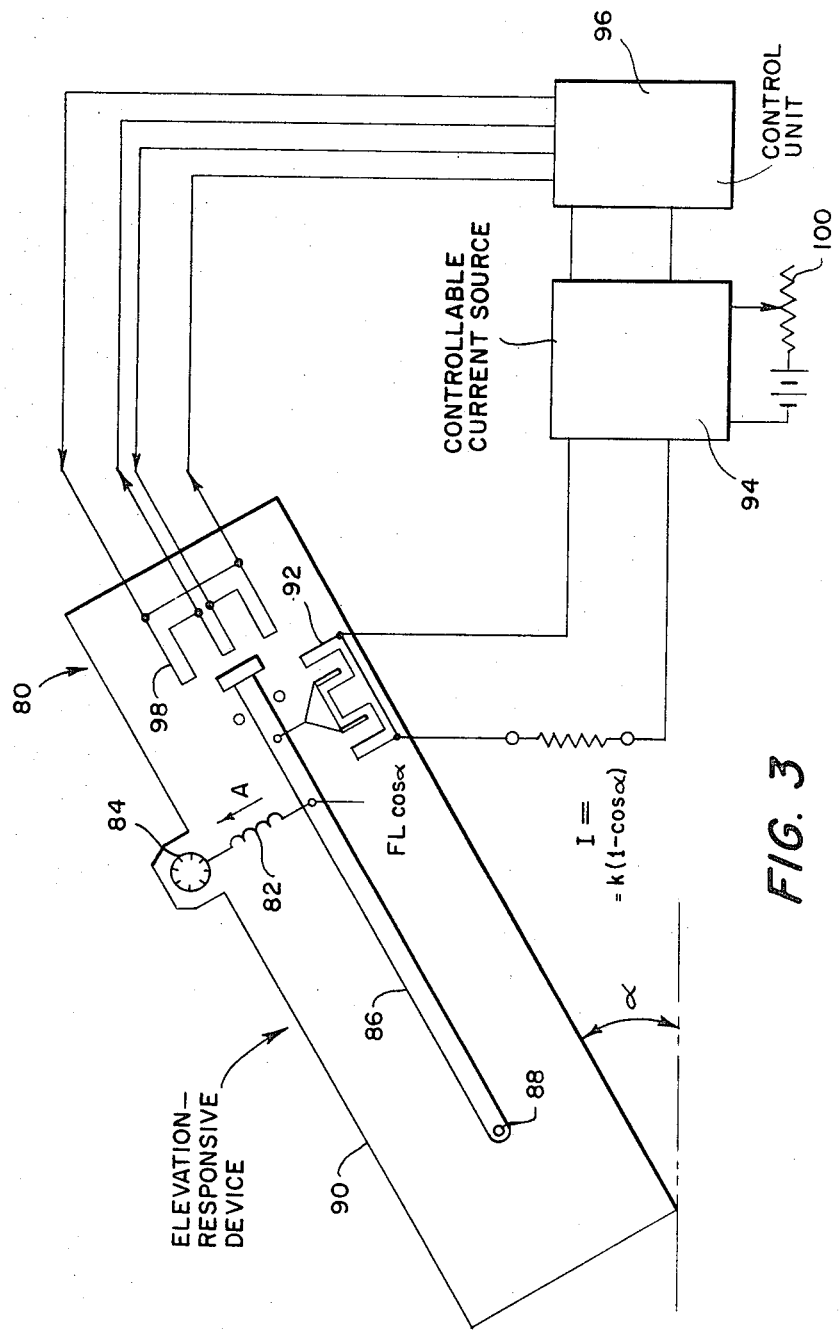

INSTRUMENT FOR MEASURING DISTANCE

FIELD OF THE INVENTION

The present invention relates to distance measuring instruments of the type wherein a modulated light beam is transmitted along the optical axis of the instrument and the reflected beam is received along this axis, the modulation phase of the reflected beam being compared with that of the transmitted beam to establish the distance to be determined in terms of the modulation wavelength.

BACKGROUND OF THE INVENTION

A number of problems are presented where an instrument of the type described above is elevatable so that the path along which the measured distance is taken is different from the horizontal. It will be appreciated that measurements obtained along paths different from the horizontal are not directly commensurate with measurements such as provided on maps used by surveyors, these latter measurements being plotted as horizontal distances between different points even where the different points in question actually are located at different altitudes. Hence, in field work, where points are to be marked out with the aid of a map of the type described, tedious corrective computations and adjustments may be necessary because of the inclination to the horizontal of the various measured distances. For example, one approach is to calculate the horizontal distance from the value of the inclined distance obtained. When this approach is used it is oftentimes found that the point to be marked out is not located precisely where the distant reflector was placed during the measurement procedure and a correction becomes necessary. It is noted that on some occasions more than one correction may be necessary in order to ensure that the correct distance is laid out.

SUMMARY OF THE INVENTION

In accordance with the present invention the procedure set forth hereinabove is substantially simplified through the provision of a measuring instrument which is adapted to automatically compute the horizontal (or vertical) distance directly. The horizontal distance in question is the product of the inclined distance traveled by the light signal and the cosine of the value of the angle of elevation (positive or negative) of the instrument. Of course, if desired, the vertical distance may be similarly obtained by multiplying the inclined distance by the sine of the angle of elevation.

In accordance with the present invention an instrument is provided for automatically varying the wavelength of the modulation signal in dependence upon the elevational angle, for example, in inverse proportion to the cosine of the elevation angle. In accordance with a presently preferred embodiment of the invention, the instrument includes an optical unit for transmitting a beam of light and for receiving a beam of light along the optical axis thereof, means for varying the elevation of the optical unit, a light transmitter for supplying a beam of light to be transmitted by the optical unit, a light receiver for receiving the light received by the optical unit, a modulation signal source connected to the transmitter for producing a modulation signal for modulating the transmitted beam of light and having a control input for varying the wavelength of the modulation signal, a device for measuring the modulation phase difference between the transmitted and received light, and an elevation-responsive device for generating a control signal in accordance with the elevation of the optical unit, the control signal being applied to the control input of the modulation signal source.

Other features and advantages of the present invention will be set forth in or apparent from the detailed description of presently preferred embodiments of the invention found hereinbelow.

BRIEF DESCRIPTION OF THE DRAWINGS

FIG. 3 is a schematic representation of one embodiment of the elevation-responsive device of the instrument in accordance with the present invention.

DESCRIPTION OF THE PREFERRED EMBODIMENTS

Figure 1:
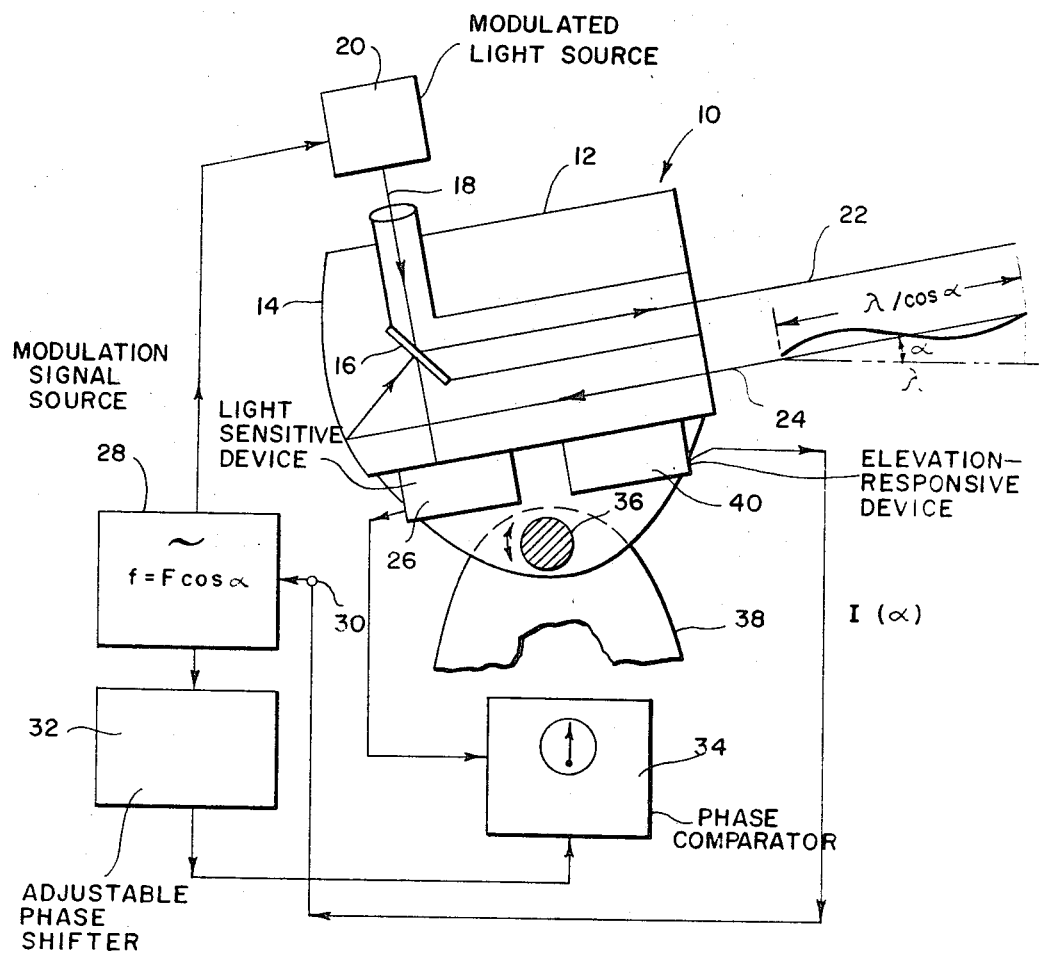
FIG. 1 is a schematic representation of a presently preferred embodiment of an instrument using the measurement of horizontal distances.

Referring to FIG. 1, a distance measurement of the coaxial type is shown, the instrument measuring distance in a conventional manner utilizing a modulated beam of light as set forth hereinabove. Because the instrument is otherwise conventional only those details are shown which are necessary for an understanding of the invention.

Thus, referring to FIG. 1, the instrument comprises an elevatable optical unit 10 including a tubular housing or tube 12 in which the optical system is contained. The optical system includes a parabolic mirror 14 mounted at the rear of tube 12 and a further mirror 16 located centrally in the tube 12 and arranged to receive a beam of light denoted 18 from a modulatable light source 20. The beam of light 18 is transmitted in the direction of the optical axis 22 of parabolic mirror 14 towards a reflector (not shown) located at the distance to be measured. The return beam of light, which is denoted 24, is reflected by mirror 14 towards the rear surface of mirror 16 and from thence to a light sensitive device 26 which may, for example, be a photocell. The output of light sensitive device 26 is a voltage proportional to the strength of the returned beam 24. The modulation signal is obtained from a modulating signal source 28 having a control input 30 for varying the frequency $f$ of the signal in dependence upon the elevation of the instrument, according to the formula $f = F\cos\alpha$. The output of modulating signal source 28 is applied to a modulated light source 20 to modulate transmitted beam 18. The output of source 28 is also applied to an adjustable phase shifter 32, phase shifter 32 enabling the phase of the output to be adjusted. The output of adjustable phase shifter 32 is connected to a phase comparator 34 which is also connected to the output of light sensitive device 26. The measurement of the distance in question is performed in a conventional manner by adjusting phase shifter 32 until phase comparator 34 reads zero. As stated, this kind of measurement is well known in the art and further explanation thereof is deemed unnecessary.

To provide for elevation thereof, tube 12 is journalled on an axis 36 supported in a support arrangement 38 indicated schematically in FIG. 1. An elevation-responsive device 40 is integrally mounted on tube 12 and responds to the elevation of the tube 12 to produce an output current $I(\alpha)$ which is supplied to control input 30 of modulating signal source 28 to adjust the frequency $f$ so that $f = F\cos\alpha$, where $\alpha$ is the elevational angle.

Figure 2:
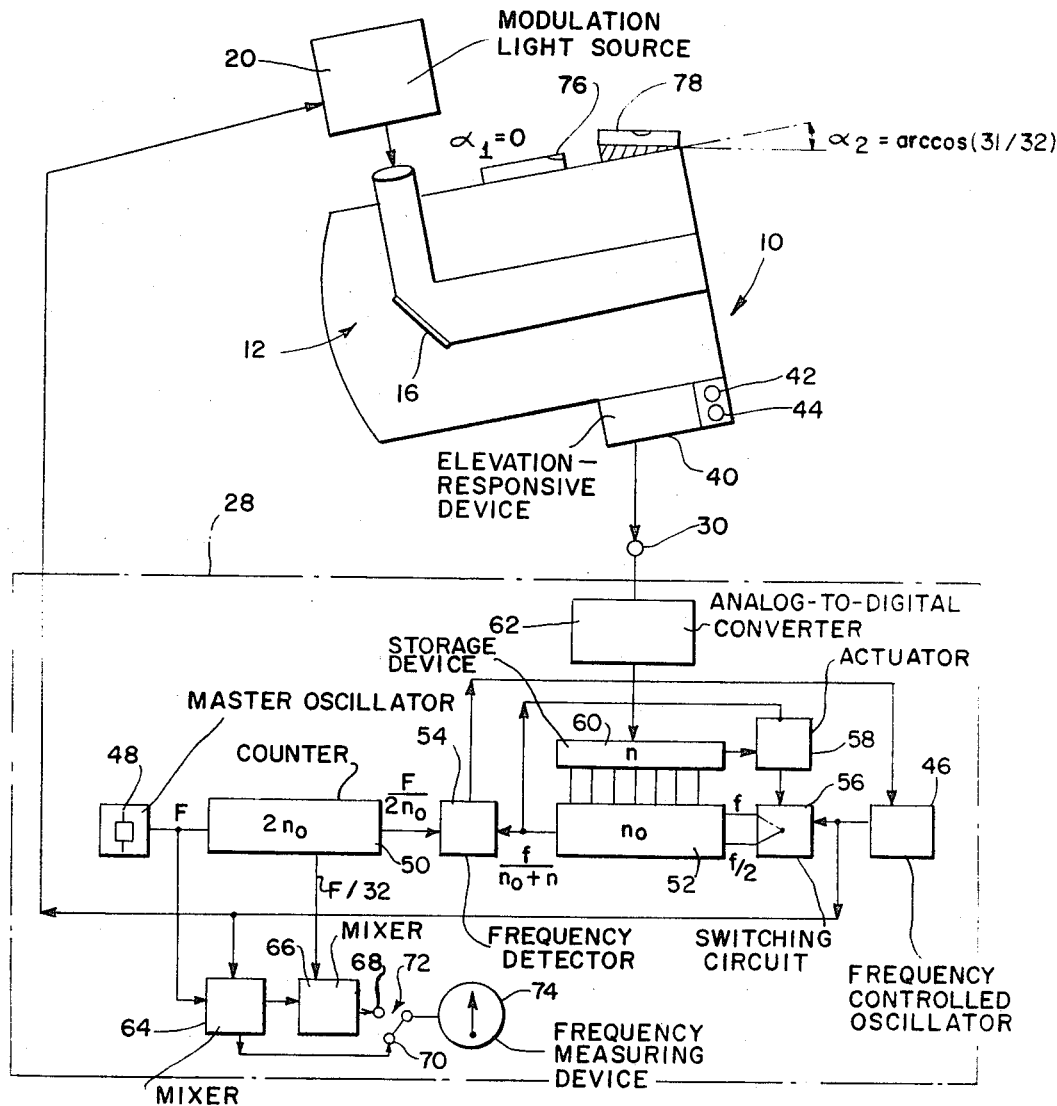
FIG. 2 is a schematic representation similar to FIG. 1 showing details of certain of the circuitry shown schematically in FIG. 1.

The operation of the instrument described hereinabove is believed to be clear from the foregoing description. It is noted that the conditions for various values of the elevation of tube 12 are schematically indicated in FIG. 1. It is clear from the foregoing if $\lambda$ and F represent the values of modulation signal wavelength and frequency, respectively, for zero elevation, when the value of the elevation is $\alpha$ the corresponding values of modulation signal wavelength and frequency are $\lambda/\cos\alpha$ and $F\cos\alpha$, respectively. This formulation implies that the horizontal projection of the modulation signal wavelength is always the same; that is, this wavelength always has the value $\lambda$. Referring to FIG. 2, a presently preferred embodiment of the modulating signal source 28 is shown in more detail. In general, FIG. 2 includes circuits for facilitating the calibration of the elevational-responsive means 40 through the provision of first and second control knobs 42 and 44 used in calibrating the output signal thereof for two values of the elevation, α1 and α2. Like elements are identified by the same numerals in FIG. 2 as in FIG. 1.

Considering FIG. 2, modulation signal source 28 includes as an essential element thereof a frequency-controlled oscillator 46 which may be of the type disclosed in Swedish Pat. No. 220,951. In general, the accuracy of frequency controlled oscillator 46 is controlled by comparing the output frequency thereof, denoted $f$, with the frequency F of a master oscillator 48 through the utilization of first and second counters 50 and 52 as described hereinbelow. Master oscillator 48 is a high-precision crystal oscillator, the output of which is supplied to the first counter 50. The capacity of counter 50 is $2n_0$ so that the output thereof comprises an oscillation of frequency $F/2n_0$, which output is connected to a frequency detector 54. The frequency $f$ derived from frequency-controlled oscillator 46 is supplied to a switching circuit 56 adapted to produce an output signal of frequency $f$ or $f/2$, depending upon the position of switching circuit 56 as determined by an actuator 58. The output from switching circuit 56 is connected to second counter 52, counter 52 having a capacity $n_0$. Counter 52 is connected to a storage device 60 in which a number $n$ is stored, the number $n$ having any value from 0 up to $n_0$. The value $n$ is derived from the elevation-responsive device 40 in an analogue-to-digital converter 62, which may be of any conventional form, in accordance with the formula $$n = n_0 (2\cos\alpha - 1) \qquad (1)$$

Actuator 58 is controlled responsive to an output pulse from counter 52 and to an output pulse from storage device 60, the latter pulse being produced when the count of counter 52 has reached the value $n$ stored in storage device 60.

As mentioned hereinabove, first and second control knobs 42 and 44 are associated with elevation-responsive device 40 for adjusting the output signal of device 40 for two predetermined values $\alpha_1$ and $\alpha_2$, respectively, of the angle of elevation. In the example under consideration, $\alpha_1 = 0$ and $\alpha_2 = \arccos(31/32)$.

Counter 52 is adapted to start counting at the frequency $f/2$ until the count reaches the value $n$. At that moment, storage device 60 produces an output pulse which is applied to actuator 58 and causes actuation of switching circuit 56 to the second position thereof in which the frequency $f$ is supplied to counter 52. The count then continues at this rate until the value $n_0$ is reached. At this time, an output pulse is provided by counter 52 and is applied to frequency detector 54 and actuator 58, the latter being reset by this pulse. The result of the operation described is that the period $T_0$ of the output signal produced by counter 52 is:

$$T_0 = (n_0 - n)T + (n) 2T \qquad (2)$$

where $T$ is the period of the output of frequency control oscillator 46. Modulating signal source 28 further includes a first mixer 64 having a first input for receiving the output of master oscillator 48 and a second input for receiving the output of frequency-controlled oscillator 46. A second mixer 66 includes a first input connected to the output of mixer 64 and a second input connected to a stage of counter 50 in which the frequency F has been divided down to the value $F/32$. The outputs from mixers 64 and 66 are connected to first and second terminals 68 and 70 which are selectively connectable to a frequency measuring device 72 by means of a switch 74.

First and second levels 76 and 78 are mounted integrally on tube 12 and are adapted to indicate the predetermined elevational angles $\alpha_1$ and $\alpha_2$, respectively, as is indicated in FIG. 2.

Considering the operation of the system described hereinabove, it is readily seen from equation (2) that the output frequency produced by counter 52 will be $f/(n_0 + n)$. The frequency detector 54 compares this frequency with the frequency $F/2n_0$ produced by counter 50 and derives an output signal representing the difference between the two signals. This different signal is used in adjusting the output of frequency-controlled oscillator 46 until equality is obtained between the two frequencies. Under these circumstances, the following formula holds:

$$f = F \cdot \frac{n + n_0}{2n_0} \qquad (3)$$

As stated hereinabove, the desired value of $f$ is $$f = F\cos\alpha \qquad (4)$$

and thus it is clear from equations (3) and (4) set forth above that the value $n$ supplied to storage device 60 should be determined in accordance with equation (1) set forth hereinabove.

It is noted that both elevational-responsive device 40 and analogue-to-digital converter 62 may be of conventional construction, ADC 62 producing an output $n$ in accordance with equation (1). One form of elevational-responsive device which is suitable for use is shown in FIG. 3 and described in more detail hereinbelow.

Considering FIGS. 1 and 2 together, with analogue-to-digital converter 62 supplying an output $n$ to storage device 60 as described hereinabove, the frequency of the modulation signals applied to modulation light source 20 varies in accordance with equation (4), meaning that the wavelength of the modulation signal is inversely proportional to $\cos\alpha$ and that the measurement of distance will be provided in terms of the horizontal projection of the wavelength of the modulation signal, that is, the distance measurement provided will be the horizontal distance between the instrument and the target object irrespective of the elevation of the instrument.

In calibrating elevation-responsive device 40 the tube 12 is first set at the angle $\alpha = 0$ with the aid of level 76. At this time, switch 72 is connected to terminal 70 and thus connects mixer 64 to frequency measuring device 74. Control knob 42 is then adjusted until frequency measuring device 74 reads zero, indicating that the output frequency $f = F$. The tube 12 is then set at the angle $\alpha_2$ with the aid of level 78 and switch 72 is connected to terminal 68 so that mixer 66 is connected to frequency measuring device 74. Control knob 44 is then adjusted until frequency measuring device 74 again reads zero, indicating that the two frequencies supplied to mixer 66 are equal. As stated hereinabove, one of these frequencies is $F/32$ and the other is the beat frequency from mixer 64 which latter frequency now also should have the value $F/32$ in that because $\cos\alpha = 31/32$ the frequency F should have the value $31F/32$.

Referring to FIG. 3, there is shown an embodiment of an elevation-responsive device, generally denoted 80, in the form of a conventional accelerometer modified in accordance with the present invention. Elevation-responsive device 80 includes a spring 82 which is adjustable by means of a knob 84 and which serves to compensate for the force of gravity exerted on a pendulum 86 when the pendulum 86 assumes a horizontal position. This type of accelerometer is otherwise known per se so that only a description of the adaptation of the accelerometer for the purposes of the present invention will be set forth. The pendulum 86 is journalled on a shaft 88 in a housing 90 and, in addition to the force of gravity, is subject to the counteracting force provided by spring 82 as set forth hereinabove and to a balancing force exerted by a magnetic coil 92. The current I through the magnetic coil 92 is supplied from a controllable current source 94 which, in turn, is controlled by a control unit 96 responsive to the unsymmetrical position of pendulum 86 relative to a balanced magnetic circuit 98. In a conventional manner, a control signal is supplied which increases or decreases the current until the balance of pendulum 86 is restored and the position thereof maintained symmetrical relative to balanced magnetic circuit 98. Thus if the inclination of the accelerometer 80 is $\alpha$ as shown, the weight of the pendulum will counteract the force A exerted by the spring 82, the counteracting force supplied by spring 82 having a value $A\cos\alpha$ and hence the remaining force to be exerted by magnetic coil 92 being proportional to $A - A\cos\alpha$. It will be understood that under these circumstances the current to be supplied to the magnetic coil 92 to restore the symmetrical position of pendulum 86 is also proportional to $1 - \cos\alpha$, that is, the current $I = k(1-\cos\alpha)$. In order to permit the adjustment of the value of the scale factor $k$ in the formula set forth above, an adjustable potentiometer 100 is provided as indicated in FIG. 3 for controlling the output of current source 94.

It is noted that in some instances it may be desirable to derive a signal from the elevation-responsive means described hereinabove which is dependent upon the sine rather than the cosine of the elevation. It is noted that the accelerometer of FIG. 3 can easily be adapted for this purpose by mounting the accelerometer at right angles to the position shown in FIG. 3 so that the accelerometer is normally vertical. The balancing spring 82 is then no longer required and the compensating force necessary to be produced by the current I will, under these circumstances, be proportional to sine $\alpha$. However, it should be pointed out that it is not usually practical to perform a distance measurement utilizing a frequency which is equal to a value $F \sin\alpha$ in that this frequency will usually be unpractically low. Thus, it is more practical to use a frequency such as $F(1-\sin\alpha\pi\frac{1}{8})$.

Although the invention has been described in detail with respect to an exemplary embodiment thereof, it will be understood by those of ordinary skill in the art that variations and modifications may be effected within the scope and spirit of the invention.

I claim:

1. An instrument for determining the projected distance to a target object from a point at an altitude different from that of the target object, comprising an optical unit for transmitting a beam of light and receiving a beam of light along the optical axis thereof, means for varying the elevation of said optical unit, a light transmitter for supplying a beam of light to be transmitted by said optical unit, a light receiver for receiving the light received by said optical unit, a modulation signal source connected to said transmitter for producing a modulation signal for modulating the transmitted beam of light and having a control input for varying the wavelength of said modulation signal, means for measuring the modulation phase difference between the transmitted and received light, means responsive to the elevation of said optical unit for generating a control signal in accordance with the elevation of said unit, and means for applying said control signal to the control input of said modulation signal source.

2. An instrument as claimed in claim 1, wherein said elevation responsive means comprises means for adjusting the value of the control signal for first and second predetermined values of the elevation, said instrument further comprising a pair of levels mounted thereon, each of said levels assuming a horizontal position at a corresponding one of said predetermined values of elevation.

3. An instrument as claimed in claim 2, wherein said modulation signal source comprises a master oscillator, a frequency-controlled oscillator and means for deriving reference frequencies from the master oscillator corresponding to said predetermined values of elevation and for comparing said derived frequencies with the frequency of said frequency-controlled oscillator.

4. An instrument as claimed in claim 3, wherein said frequency comparing means comprises a first mixer having a first input for receiving the reference frequency and a second input for receiving a frequency derived from the frequency-controlled oscillator, and a frequency measuring device selectively connectable to the output of said mixer.

5. An instrument as claimed in claim 4 further comprising a second mixer having a first input connected to the output of said first mixer and an output selectively connectable to said frequency measuring device, and a counter having an input connected to said master oscillator and an output connected to a second input of said second mixer.

* * * * *